No. 877,559.

PATENTED JAN. 28, 1908.

A. FISCHER.

BUTTER KNEADING MACHINE.

APPLICATION FILED OCT. 25, 1906.

Witnesses:
Abraham Schlesinger
Louis Mueller

Inventor:
Albert Fischer

UNITED STATES PATENT OFFICE.

ALBERT FISCHER, OF AUGSBURG, GERMANY.

BUTTER-KNEADING MACHINE.

No. 877,559.

Specification of Letters Patent.

Patented Jan. 28, 1908.

Application filed October 25, 1906. Serial No. 340,533.

*To all whom it may concern:*

Be it known that I, ALBERT FISCHER, a subject of the King of Bavaria, and residing at Augsburg, in Bavaria, Germany, have invented a Butter-Kneading Machine, of which the following is a specification.

This invention relates to a butter-kneading machine in which a truncated conical kneading-roller placed with its major diameter near the center of a revolving inverted conical kneading-plate is alternately revolved in both directions, in order to obviate the necessity of turning and scraping the butter from the kneading-plate by hand or of providing special devices for the operations of scraping and turning. For this purpose suitable reversing-gear is provided, by means of which the kneading-roller is alternately revolved in the direction corresponding to the movement of the plate, and in the opposite direction.

Figure 1:
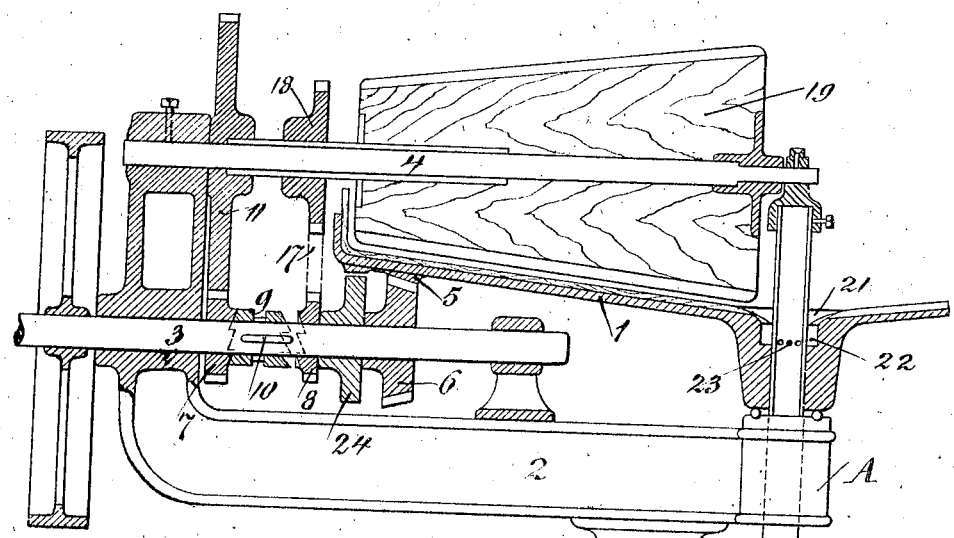
Figure 2:
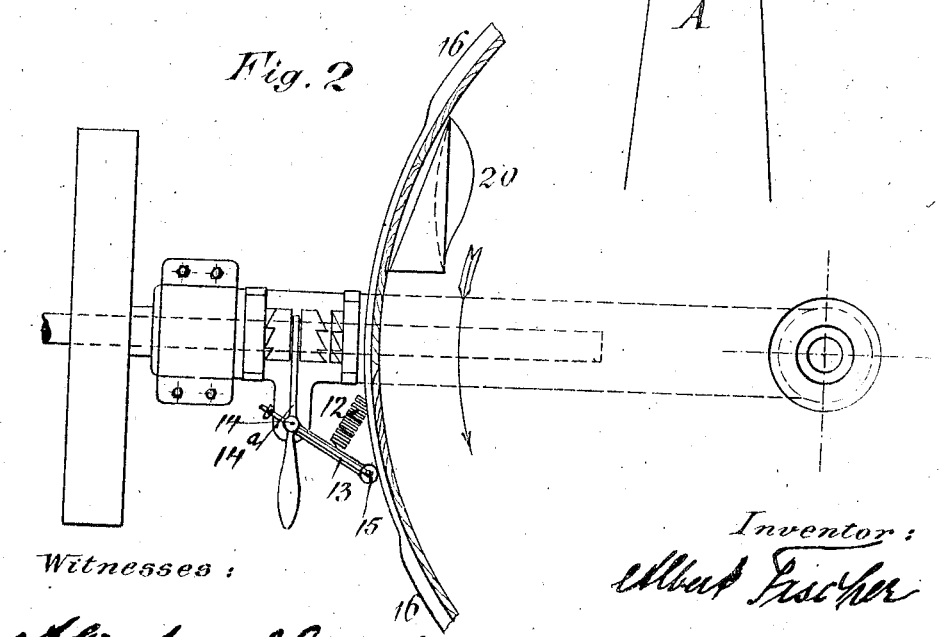

The invention is illustrated in the annexed drawing by means of an example, Figure 1 being a vertical section of part of the machine, and Fig. 2 a plan view.

The revoluble pan or kneading-plate 1 is supported by the pedestal A. To the latter is screwed the arm 2 provided with bearings for the driving shaft 3 and the axle 4 of the kneading-roller. The upper surface of the plate 1 slopes downwards towards the center thereof, and the plate is provided near its circumference with crown-teeth 5 meshing with the gear-wheel 6 fixed to the driving-shaft 3. On the latter is mounted the roller 24, which serves as a support for that portion of the plate 1 which is subjected to the highest pressure during the working of the machine.

Continuous movement is imparted to the plate 1 by means of the gear wheel 6 and shaft 3. On the latter the gear-wheel 7 and sprocket-wheel 8 are revoluble but not axially movable. The clutch 9 located between the wheels 7 and 8 engages the shaft 3 by means of the spline 10, and is axially movable but not revoluble on the said shaft. The hub parts of the wheels 7 and 8 are provided with recesses adapted to be engaged by the clutch. The toothed wheel 11 fixed to the axle 4 of the kneading-roller 19 meshes with the toothed wheel 7, so that when the clutch 9 engages the latter the wheel 11 and roller 19 are revolved in the direction corresponding to the direction of rotation of the kneading-plate 1. The force required for holding the clutch in engagement with the toothed wheel 7 is supplied by the helical spring 12 connected to the double-armed lever 13 fixed at 14 to the clutch fork 14$^a$. The roller 15 at one end of the lever 13 is held by the spring 12 in contact with the circumference of the plate 1, in the path of the cam parts 16 formed on the said circumference. Actuation of the lever 13 by the said cam parts causes the clutch 9 to be disengaged from the toothed wheel 7 and thrown into engagement with the sprocket wheel 8. The latter is connected by the chain 17 to the sprocket-wheel 18 fixed to the axle 4, so that by coupling the wheel 8 to the shaft 3, and by uncoupling the wheel 7, the direction of rotation of the kneading-roller 19 is reversed, that of the kneading-plate remaining unchanged. The adjacent surfaces of the plate and roller are thus caused to move in opposite directions and the butter spread on the plate is rolled together by the roller, in order to be kneaded between the plate and roller when the rotation of the latter is subsequently reversed.

The kneading-roller is in the form of a truncated cone arranged with its larger base adjacent the center of the plate 1. This arrangement has the effect that when the roller is revolving for the purpose of rolling up the butter, the latter is pushed outwards and worked into the shape of a cone similar to that which a skilful workman produces operating with his hands or with spatulas during the rotation of the plate.

The guard plate 20 shown in Fig. 2 prevents the passage of butter over the edge of the plate.

The butter-milk is carried off in the known manner by means of the central, perforated pipe 23, to which is fixed the plate 22 located below the aluminium plate 21 fixed to the kneading-plate 1. This arrangement prevents the passage of the liquid to the bearing of the kneading-plate.

What I claim as my invention and desire to secure by Letters Patent of the United States is:—

1. In a butter-kneading machine the combination of an inverted conical kneading pan, a revoluble kneading roller mounted thereover, means for revolving said pan and roller and means for causing the directions of revolution of said roller and pan to be alternatively similar or contrary to one another for the purpose set forth.

2. In a butter-kneading machine the combination of an inverted conical kneading pan, a truncated conical kneading roller mounted radially to said pan so that its larger diameter is above the smaller diameter of the pan, and its smaller diameter is above the larger diameter of the pan, and means for revolving the pan and roller in similar and contrary directions alternatively for the purpose set forth.

3. In a butter-kneading machine the combination of revoluble kneading pan, means for revolving the same in one direction, a truncated conical revoluble kneading roller mounted thereover and having its major diameter towards the center of the pan means for revolving the pan and roller and means operated by the pan in its revolution for automatically reversing the direction of revolution of said roller without reversing that of the pan for the purpose set forth.

4. In a butter-kneading machine the combination of an inverted conical pan, means for rotating said pan in one direction, a truncated conical kneading roller mounted over said pan, with its major diameter towards the center of the pan, means for driving said roller in opposite directions, and means operated in conjunction with the rotation of the pan for periodically changing the direction of revolution of the roller without changing that of the pan.

In witness whereof I have signed this specification in the presence of two witnesses.

ALBERT FISCHER.

Witnesses:
ABRAHAM SCHLESINGER,
LOUIS F. MUELLER.